Figure 1:
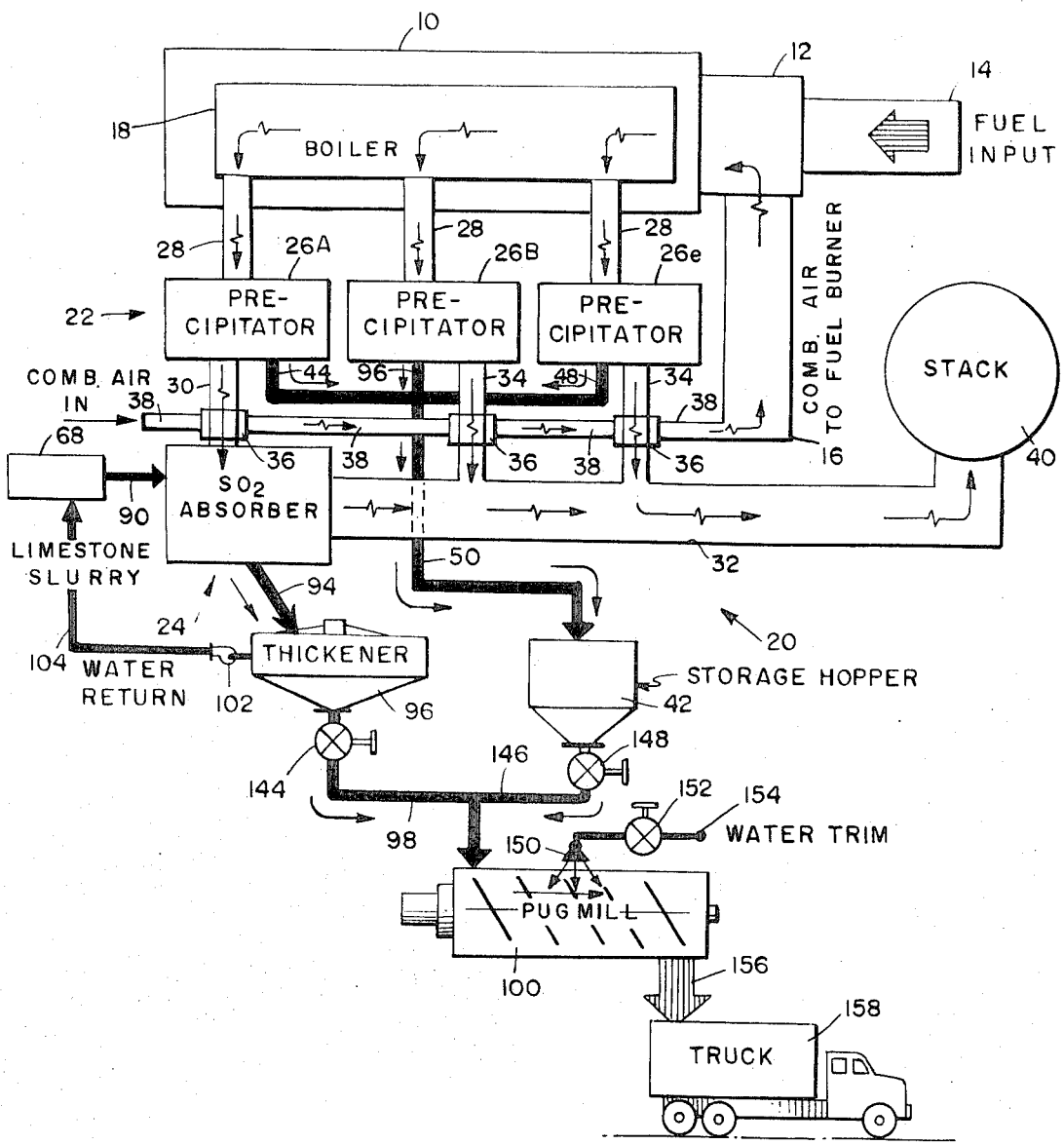

United States Patent [19]

McIlvaine

[11] 3,785,119

[45] Jan. 15, 1974

[54] METHOD AND APPARATUS FOR REMOVING PARTICULATES AND OXIDES OF SULPHUR FROM GAS

[75] Inventor: Robert W. McIlvaine, Northbrook, Ill.

[73] Assignee: Environeering, Inc., Skokie, Ill.

[22] Filed: Oct. 4, 1972

[21] Appl. No.: 295,006

[52] U.S. Cl............................. 55/7, 23/260, 55/11, 55/22, 55/73, 55/122, 55/124, 55/343, 55/466, 55/DIG. 41, 110/119, 261/DIG. 9, 423/215, 423/242, 425/472, 432/72

[51] Int. Cl............................................... B03c 3/04

[58] Field of Search........................ 55/6, 7, 10, 11, 55/22, 73, 101, 122, 124, 343, 466, DIG. 41, 128, 135, 315, 220, 223, 260; 23/260, 261, 262, 274, 277 R, 278, 281; 110/119; 34/57 R; 75/25, 60; 261/DIG. 9; 423/215, 242, 244; 425/472, 317; 432/72; 241/18 X

[56] References Cited
UNITED STATES PATENTS

| 746,256 | 12/1903 | Baggalen | 55/DIG. 41 |
|---|---|---|---|
| 2,277,663 | 3/1942 | Francis et al. | 75/25 |
| 2,548,332 | 4/1951 | Alexander et al. | 34/57 R |
| 2,729,301 | 1/1956 | Ekstrom, Jr. | 261/DIG. 9 |
| 2,855,292 | 10/1958 | Vogt | 75/60 |
| 2,901,324 | 8/1959 | Howell | 55/124 X |
| 3,008,807 | 11/1961 | Hilgert et al. | 23/260 |
| 3,203,156 | 8/1965 | McGregor et al. | 55/223 |
| 3,248,177 | 4/1966 | Grolee | 23/262 |
| 3,494,107 | 2/1970 | Sackett, Sr. | 266/15 X |
| 3,687,613 | 8/1972 | Rickard | 241/18 X |

*Primary Examiner*—Dennis E. Talbert, Jr.

[57] ABSTRACT

The method of removing dry particulates and oxides of sulphur from gas comprises passing said gas through a dry treatment stage for separating dry particulates therefrom, passing a portion of said gas treated in said dry treatment stage through a wet absorber stage for separating the oxides of sulphur therefrom, and intermixing said dry particulates separated in said dry treatment stage with the wet, sulphur containing materials separated from the gas in said wet absorber stage producing a semi-dry material suitable for use in land fills and the like.

25 Claims, 2 Drawing Figures

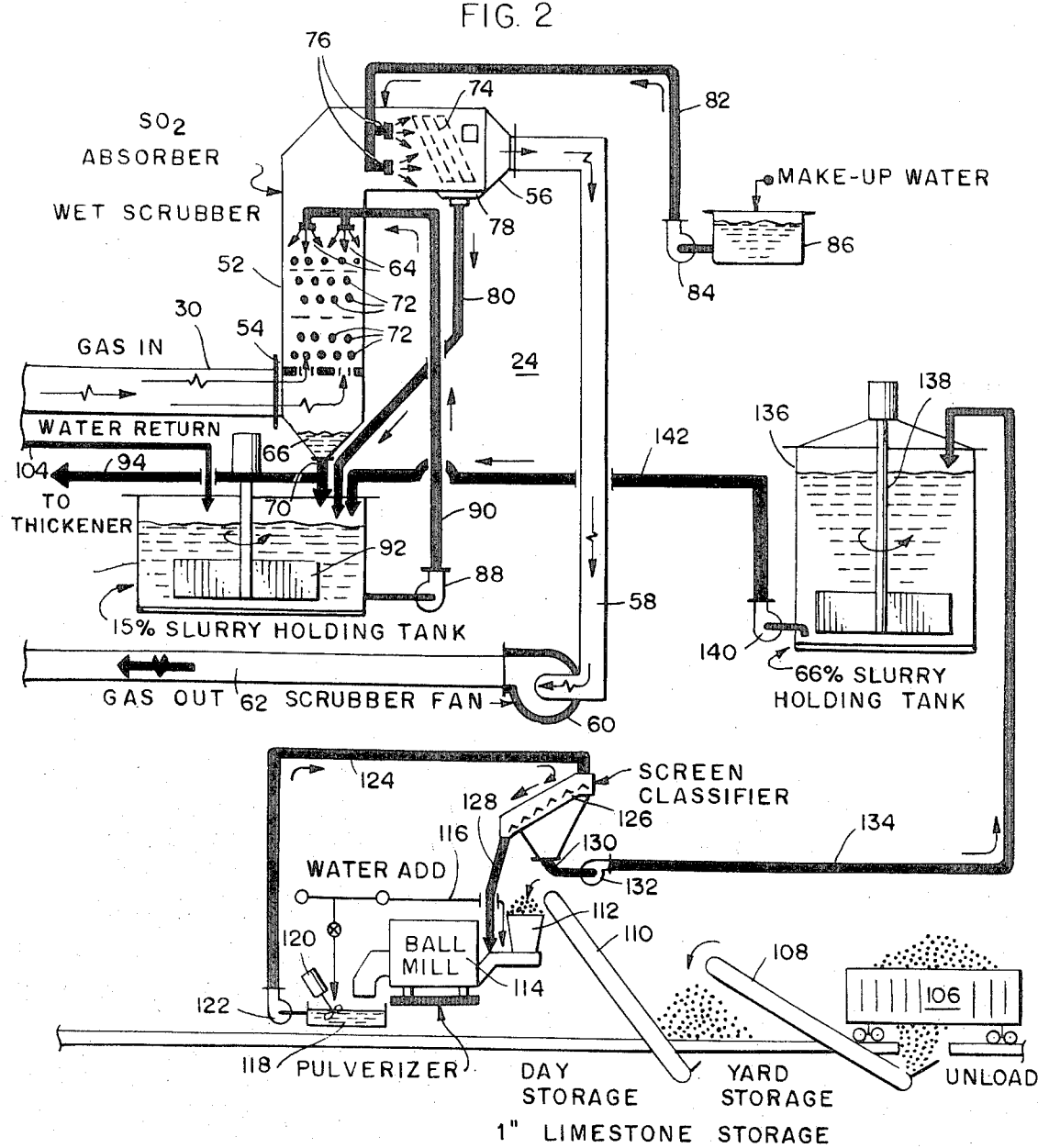

METHOD AND APPARATUS FOR REMOVING PARTICULATES AND OXIDES OF SULPHUR FROM GAS

The present invention relates to a new and improved method and apparatus for removing dry particulates and oxides of sulphur from gas. More particularly, the present invention is adapted for use in treatment of flue gases generated fuel burning equipment such as boilers and the like wherein the fuel used contains sulphur and wherein the burning process produces solid particulates in the flue gases. In solid fuels such as coke and coal, sulphur may be present in varying quantities and when the fuel is utilized in fuel burning equipment or other processes, sulphur dioxide is formed and is present in the exhaust or flue gases. Sulphur dioxide in any appreciable quantity if discharged into the atmosphere is hazardous to health and is also objectionable from an odor standpoint. In addition, flue gases containing quantities of solid particulates such as fly ash and the like are also objectionable from an air pollution standpoint.

In accordance with the method and apparatus of the present invention gaseous oxides of sulphur and solid, dry particulates are extracted from the flue gas before the gas is discharged to the atmosphere. One method used for removing the oxides of sulphur from flue gas is to treat the gas with a scrubbing liquor comprising crushed limestone rock and water. The calcium of the limestone reacts with the sulphur dioxide in the flue gas to produce the wet, sloppy precipitate containing calcium sulphite and/or calcium sulphate, which material is removed from the gas stream. One of the difficulties with this type of system is that wet, sloppy material containing the precipitated calcium sulphate and/or calcium sulphite is very difficult to dry and is unsuitable for use as land fill material wherein the material is to be covered over by dirt or other fill. Because of the tendency of the wet precipitates produced in this limestone slurry process to remain wet and sloppy for long periods of time, disposal of the effluent becomes a major problem. Drying the material to the point where it is suitable for use as land fill material is expensive.

The present invention provides an economical process and apparatus for cleaning flue gases which contain both dry particulate matter and oxides of sulphur and the residue or effluent from the process is suitable for use as land fill. The effluent material has a controlled moisture content and does have a wet, sloppy consistency.

It is an object of the present invention to provide a new and improved method and apparatus for removing oxides of sulphur and drive particulates from gas such as flue gas.

It is another object of the invention to provide a new and improved method and apparatus for treating gas and removing gaseous oxides of sulphur and dry particulates in a manner whereby the effluent material that is generated in the process is suitable for use as sanitary land fill material without requiring any further treatment.

Still another object of the present invention is to provide a new and improved method and apparatus for the treament gas of the character described wherein dry particulate matter is first removed from the gas in a dry separation stage and a portion of the treated gas is subsequently treated in a wet scrubbing, gas absorber stage wherein oxides of sulphur are absorbed and precipitated out as calcium sulphate and/or calcium sulphite.

Another object of the invention is to provide a new and improved method and apparatus of the character described wherein the final effluent material produced in the process has a relatively low moisture content, for example, a moisture content of approximately 15 percent.

Another object of the present invention is to provide a new and improved pollution control system wherein the cleansed gas discharged from the system into the atmosphere does not produce a visible plume because of high moisture content therein.

Yet another object of the invention is to provide a new and improved method and apparatus of treating gas of the character described wherein the process is readily adjusted to accommodate a wide range of fuels which may be utilized in the fuel burning equipment with which the treatment system is associated.

Yet another object of the invention is to provide a new and improved pollution control system of the character described wherein the cleansed gas that is discharged to the atmosphere has an acceptably low percentage of sulphur dioxide therein and an acceptably low percentage of dry particulate matter such as fly ash, and wherein the effluent material produced in the process is sufficiently low in moisture and of suitable consistency for use in soil beneficiation and land fill operations.

The foregoing and other objects and advantages of the present invention are accomplished in a new and improved method of removing dry particulates and oxides of sulphur from gas which comprises passing the gas through a dry separation stage for removal of the dry particulates therefrom. A portion of the gas so treated is then passed through a wet scrubber absorber stage for removal of the oxides of sulphur. This portion is then reunited with the gas treated only in the dry separation stage before discharge to the atmosphere.

In the wet absorber stage the gas is treated with a mixture of limestone and water and precipitates of calcium sulphite and/or calcium sulphate are formed and removed from the gas. The dry particulate material removed in the dry separation stage is intermixed with the wet precipitous materials removed in the absorber stage and the two materials are mixed in suitable ratio so that the final effluent material has a low moisture content and is useful as land fill material.

For a better understanding of the invention reference should be had to the following detailed description taken in conjunction with the drawings, in which:

FIG. 1 is a schematic flow diagram illustrating units of equipment and the flow of materials in a pollution control system in accordance with the features of the present invention; and FIG. 2 is a schematic flow diagram illustrating units of equipment and the flow of materials in the wet scrubber absorber stage of the system of FIG. 1.

Referring now more particularly to the drawings, therein is schematically illustrated a new and improved pollution control system for treating gas to remove dry particulates and oxides of sulphur therefrom. Commonly in electrical power generating stations and other industrial applications wherein solid fuel such as coal and coke containing appreciable amounts of sulphur is burned to produce heat and/or fluid energy, one of the problems associated with the burning of the fuel is the removal of the oxides of sulphur contained in the products of combustion before eventual discharge of the exhaust or flue gas to the atmosphere. In areas where low sulphur coal is used as a fuel the problem of sulphur dioxide in the stack gas is not as acute as in areas where high sulphur coal (for example about 3 percent sulphur) is commonly burned as economic fuel. In addition to sulphur dioxide, the combustion of solid fuels such as coal and coke produces considerable amounts of solid particulate matter such as fly ash. In FIG. 1 is illustrated a schematic flow diagram wherein a coal or coke fire furnace or boiler 10 fired by a burner assembly 12 is used for the production of heat energy. The burner 12 is supplied with the solid fuel via a stoker or fuel input section 14 and combustion air for oxidizing the fuel is introduced through an air supply duct and plenum 16. The solid fuel and air supplied to the burner 12 are combusted to produce heat energy and the resultant products of combustion in the form of high temperature exhaust gases are collected in an exhaust plenum or manifold 18.

The high temperature flue or exhaust gas in the exhaust plenum 18 of the boiler 10 contains a percentage of sulphur dioxide which is dependent upon the amount of sulphur contained in the fuel used in the boiler. In addition, the hot exhaust gas contains appreciable quantities of dry particulate material such a fly ash. In order to comply with pollution control laws presently in force and to meet future standards, it is usually necessary to reduce the sulphur dioxide and fly ash or dry particulate material in the gas to lower percentage levels before the exhaust gas may be discharged into the atmosphere. Accordingly, the high temperature flue gas from the boiler plenum 18 is treated in accordance with the present invention to reduce the quantities of dry particulates or solid materials in the gas and to absorb some of the vaporous sulphur dioxide contained in the gas.

A pollution control system in accordance with the present invention is represented schematically in FIG. 1 and is referred to generally by the reference numeral 20. The system includes a first, dry, particulate separation stage 22 wherein all of the high temperature gas exiting the boiler plenum 18 is treated to remove dry particulate materials therefrom. After treatement in the dry separation stage, a fractional portion of the gas is treated in a second, wet scrubber absorber stage 24 wherein the sulphur dioxide in the flue gas is absorbed by contact with a slurry of limestone and water. The limestone reacts with the sulphur dioxide to form a wet, sloppy precipitate containing calcium sulphate and/or calcium sulphite and this material is removed from the gas.

Preferably the dry, separation stage 22 comprises a plurality of electrostatic precipitators 26A, 26B, and 26C, each precipitator being supplied with hot flue gases via a separate, inlet supply duct 28 connected to the boiler plenum 18. The high temperature flue gas passing through the precipitators is subjected to an electrostatic field and a high percentage of the dry, solid, particulate matter contained in the gas is separated out and removed from the gas stream. Treated gas from the precipitator 26A is directed into the wet scrubber absorber stage 24 via an outlet duct 30 (FIGS. 1 and 2), and the hot gas from the precipitators 26B and 26C are directed into a common mixing duct 32 via separate outlet ducts 34. The high temperature gas passing out of the precipitators through the respective outlet ducts 30 and 34 may be cooled if desired, down to approximately 300°F by passage through heat exchangers 36. The heat given up by the flue gas in these heat exchangers is used to preheat the combustion air delivered to the combustion air plenum 16. A combustion air inlet duct 38 interconnects the heat exchangers 36 and the combustion air plenum. The temperature of the hot flue gases after treatment in the precipitators 26A, 26B, and 26C is reduced by passage through the respective heat exchangers 36 and the temperature of the combustion air supplied to the burner assembly 12 is increased. The gas introduced into the mixing duct 32 from the precipitators 26B and 26C via the outlet ducts 34 is reduced to a considerably lower temperature than it would be without passage through the heat exchangers 36.

The mixing duct 32 is connected at its outlet end to a vertical stack or chimney 40 for discharge of the cleansed gases to the atmosphere. From the foregoing it will be seen that all of the hot flue gases produced in the boiler 10 are first treated in a dry separation stage 22 comprising a plurality of separate electrostatic precipitators 26A, 26B, 26C etc. for removal of particulate matter and a fractional portion of the gas so treated is then directed into a second, wet scrubber absorber stage 24 for absorption and removal of the sulphur dioxide contained in the gas. Only a fractional portion of the total flue gas produced in the boiler 10 is treated in the second wet absorber stage 24, and the fractional portion is determined by the amount of sulphur present in the coke or coal supplied to the burner assembly 12 and the pollution standards or air quality standards in effect. For example, if the air quality standard requires that the content of the sulphur dioxide in the stack gas be at a level below 1.0 parts per million (ppm) and if the boiler 10, operated at full capacity with a given type of coal as fuel would produce 1.2 ppm of $SO_2$, only one-third of the total gas volume could be treated in the second, wet scrubber absorber stage 24, assuming the wet scrubber stage is operated at a removal efficiency of 75 percent or greater. In this instance 0.3 ppm of sulphur dioxide would be removed therein leaving a total of 0.9 ppm in the exhaust gases discharged through the stack. The fractional streams treated only in the dry stage 22 would contain two-thirds of the original $SO_2$ content or 0.8 ppm and this would be mixed with the wet gas leaving the scrubber stage 24 having only 0.1 ppm of $SO_2$. The total amount of $SO_2$ in the stack gas would be at the 0.9 level which meets and is below the required 1.0 ppm level of $SO_2$ set by the air pollution standard in effect. The absorption of $SO_2$ down to acceptable levels is thus accomplished with a smaller size absorber than would be required if the entire or total volume of gas produced is treated in both stages and also with only a fraction of the gas treated in the second, wet scrubber absorber stage 24, the resulting wet, sludge material that is generated in the process is greatly reduced and the reduced volume is much more easily disposed of and handled on an economically sound basis. All of the hot gases from the boiler exhaust plenum 18 are first treated in the dry, separation stage 22 in the precipitators 26A, 26B, and 26C but only a fractional portion of this volume is treated in the second wet stage 24 for removal of $SO_2$. After treatment in the second wet stage the gas is saturated with moisture and at a relatively low temperature in comparison to the relatively hot, dry gases treated only in the precipitators 26B and 26C. In accordance with the invention, the saturated, low temperature gas coming from the wet scrubber absorber stage 24 is intermixed with the hot, dry gases coming from the precipitators 26B and 26C in the mixing duct 32 and the relative humidity or moisture saturation level of the mixture of the two fractions in the stack 40 and discharged into the atmosphere is reduced considerably to a low level. The moisture content in the stack gas is at a sufficiently low level that a visible plume of condensed moisture is not produced at the upper end of the stack. Requirements for the elimination of a visible plume from exhaust stacks and chimneys have sometimes necessitated the use of reheat equipment in order to lower the relative humidity of the gas before discharge from a stack into the atmosphere, however, the present invention eliminates the necessity for reheating equipment by mixing of the cold, wet gas from the absorber stage 24 with the hot dry gas treated in the precipitators 26B and 26C.

The dry, particulate material that is separated from the gas in the precipitators 26A, 26B, and 26C of the dry separation stage 22 is collected and directed into a storage or surge hopper 42 and is metered from the hopper for mixing with the wet, sloppy sludge material containing precipitates of calcium sulphite and calcium sulphate produced in the wet scrubber absorber stage 24. The dry particulates removed in the precipitators 26A, 26B and 26C are delivered to the storage hopper 42 via a plurality of branch ducts 44, 46 and 48 interconnected to a common duct or chute 50 and because of the tendency of fly ash and the other dry particulate materials to dust, the storage hopper 42 and the transfer system of ducts 44, 46, 48 and 50 are enclosed or covered to prevent escape of material into the atmosphere.

Referring to FIG. 2, the second, wet, scrubber absorber stage 24 is therein shown schematically and includes a wet scrubber having a housing 52 with an inlet 54 at the lower end for receiving hot gas from the outlet branch duct 30 of the single electrostatic precipitator 26A. The hot gas flows vertically upwardly through the scrubber housing 52 towards the upper end and then is directed horizontally outwardly into a final washing section 56 before discharge into an outlet duct 58 leading to a main scrubber fan 60. The scrubber fan 60 delivers the wet scrubbed gas to the mixing duct 32 through a transitional duct 62 and in the mixing duct the low temperature, wet gases from the scrubber absorber stage 24 are mixed with the hot dry gases which have been treated only in the precipitators 26B and 26C.

As more fully described in the copending U.S. Pat. application Ser. No. 334,739, filed Feb. 22, 1973 and assigned to the same assignee as the present invention, the hot gases flowing upwardly in the scrubber housing 52 are washed and scrubbed with a downwardly flowing spray of finely divided liquid droplets of a mixture comprising water and finely divided limestone. This mixture or limestone slurry is discharged downwardly counter to the upward gas flow from a plurality of spray nozzles 64 positioned adjacent the upper end of the vertical section of the scrubber housing 52. The limestone slurry chemically interacts with the sulphur dioxide in the upwardly moving hot gas to absorb and precipitate out a wet, sloppy mixture containing calcium sulphate and/or calcium sulphite. This material gravitates downwardly against the gas flow and eventually collects in the lower end or sump 66 of the scrubber housing for discharge into a "15 percent slurry holding tank" 68 via an outlet line 70.

Between the upper spray nozzles 64 and the sump 66 in the scrubber housing there is provided a plurality of horizontal rods 72 arranged in spaced apart parallel relation in multiple, vertically stacked layers at different levels in the housing. The surfaces of the rods provide means for breaking up and momentarily diverting the downwardly cascading spray of limestone slurry to insure that thorough intermixing of the hot gas and liquid slurry is obtained. The vertical spacing between the layers of rods 72 is ample to permit the rods to be easily removed, cleaned and replaced if desired, and rods may occupy a total area of cross-section in the housing in a range from 30 percent to 60 percent of the total cross-sectional flow area of the scrubber housing 52. The velocity of the gas and the liquid droplets is increased in the vicinity of the rods above the average flow velocity. A scrubber of the type shown and described herein is very efficient in the removal of sulphur dioxide from the hot gas and generally may operate at $SO_2$ removal efficiencies of up to 95 percent with a relatively low pressure drop. Accordingly the energy required per cubic foot of gas handled by the scrubber is relatively low thus making the operation of the system very economical. A countercurrent general flow of the scrubbing liquor or limestone slurry in relation to the gas flow provides for the most advantageous and efficient absorption of the $SO_2$ because the concentrated scrubbing liquor is introduced at the upper level where the gas contains the least percentage of $SO_2$, the major portion of $SO_2$ having already been absorbed as the gas flows upwardly from the lower levels of the housing. As the wetted gas reaches the upper end of the scrubber housing 52 it is substantially saturated with moisture and substantially all of the $SO_2$ has been removed. The gas is directed horizontally into the washing section 56 of the housing and passed through a bank of upstanding Z-shaped demisting vanes 74 for a final removal of any scrubbing liquid droplets that may remain in the gas. The demist vanes 74 are continuously flushed with fresh, makeup water via a plurality of spray nozzles 76 and this water washes down the vanes to collect the agglomerated droplets of slurry impinging on the angle surfaces of the vanes. The wash water and slurry collects in a sump section 78 and is returned to the "15 percent slurry holding tank" via a return line 80. Fresh makeup water is supplied to the spray nozzles 76 via a line 82 and pump 84 from a fresh water makeup tank 86. A highly concentrated limestone slurry is supplied from the "15 percent slurry holding tank" to the spray nozzles 64 in the upper end of the scrubber housing 52 under suitable pressure via a main slurry pump 88 and line 90. The inlet of the pump 88 is supplied with limestone slurry from the lower levels of the "15 percent slurry holding tank" so that the most highly concentrated limestone slurry is introduced into the scrubber housing 52. The tank 68 includes a motor driven agitator 92 to keep the limestone and precipitated material in liquid suspension for recirculation by the pump 88 and supply line 90.

In accordance with the present invention, a fractional portion of the precipitated out wet sludge material collecting in the scrubber sump 66 is diverted away from the slurry tank 68 via a line 94 which is connected to a thickening tank 96 (FIG. 1). This wet, sloppy, sludge material which contains water and precipitates of calcium sulphite and/or calcium sulphate may include about 15 percent solid material. The thickener mixer 96 is provided with a slow moving spiral rake which is rotated over a shallow sloped conical bottom of the mixer thus permitting the water in the slurry to rise and the thicker, solid sludge material to settle toward the bottom. This thickened sludge contains about 30 percent solids and is discharged through a line 98 to an auger type, blending mixer or pug mill 100. The water rising toward the upper level of the thickener tank 96 is returned back to the "15 percent slurry holding tank" 68 by means of a water return pump 102 and line 104.

Referring particularly to the second, wet, scrubber absorber stage 24 as shown schematically in FIG. 2, because a portion of the sloppy, wet sludge material precipitated out of the gas and collected in the sump 66 of the scrubber housing 52 is directed via the line 94 into the thickener tank 96 rather than return to the tank 68, additional limestone slurry makeup may be needed and is supplied to the 15 percent slurry holding tank to insure that a fresh, highly concentrated supply of limestone slurry is available for contact with the gas in the scrubber housing. Limestone rock is delivered to a storage area via a freight car 106 or truck and is then unloaded into a limestone yard storage area by a suitable unloading conveyor 108. In turn limestone rock from the yard or day storage area is loaded via a conveyor 110 into the feed hopper 112 of a ball mill 114 used for pulverizing the limestone into small size particles needed for making up a liquid slurry. Water is added to the pulverized limestone rock in the ball mill via a water line 116 and a thickly concentrated slurry of crushed limestone and water is discharged into a holding tank 118 which is continually agitated by a stiring device 120. The thick slurry from the tank 118 is directed via a pump 122 and line 124 into a screen device 126 wherein oversize limestone particles are returned to the ball mill for further pulverizing via an oversize chute 128. The onsize material is delivered via a conduit 130 connected to the inlet of a pump 132 which moves the rich slurry through a conduit 134 into a "66 percent slurry holding tank 136." This tank is also provided with a rotary mixing device 138 for maintaining the 66 percent slurry in a fluid condition without permitting the limestone to settle out and solidify in the tank bottom. The thick slurry is directed from the tank 136 into the "15 percent slurry holding tank 68" to make up for the wet sludge material sent to the thickener mixer 96 via the line 94. A slurry pump 140 and makeup line 142 are provided for this purpose so that during operation the slurry supply is continually replenished by fresh, thick limestone slurry of high concentration supplied from the 66% slurry holding tank 136."

The wet, sloppy, sludge material delivered to the thickener mixer 96 from the sump 66 in the absorber housing 52 normally contains approximately 15 percent solids and in the thickening mixer, the concentration of solids is increased to approximately 30 percent or greater. The underflow of more solid materials from the bottom of the mixer tank is discharged to the pug mill 100 via the line 98 and a control valve 144 is provided to regulate or meter the flow rate of wet sludge material that is intermixed with the dry particulate materials supplied from the storage hopper 42. The dry materials delivered to the pug mill 100 flow via a line 146 and control valve 148 so that the ratio of wet and dry may be adjusted.

In the pug mill 100 the wet, sludge containing approximately 30 percent solids is intermixed with the dry particulate material obtained from the electrostatic precipitators 26A, 26B and 26C and if required to prevent dusting additional trim water may be supplied via spray nozzles 150 and a metering control valve 152 provided in makeup trip water line 154. When the dry particulate material from the first, dry, separation stage 22 is blended with the wet sludge from the second, absorber scrubber stage 24 in the pug mill 100, a relatively dry product (approximately 14 percent moisture content) is produced and is discharged from the outlet 156 of the pug mill into a truck 158 or other suitable conveyance. The waste material may have some trim water added to bring up the moisture content and prevent dusting and the product is then suitable for use in sanitary land fills and the like.

Depending upon the particular quality of the fuel being burned in the burner system 12 of the boiler 10 and the amount of sulphur therein and particulate matter produced, the ratio of wet sludge material precipitated out in the wet scrubber absorber stage 24 to the particulate separated in the dry precipitator stage 22, may vary and can be adjusted by means of the valves 144 and 148 and hopper 42 to provide a finished product discharged from the pug mill 100 having an acceptable moisture content. The trim water supplied to the pug mill may be varied to make adjustments in the consistency of the material and aid in the mixing process. The total amount of water in the material discharged from the pug mill outlet 156 comes partly from the water contained in the wet sludge material separated from the gas from the wet scrubber absorber stage 24 and partly from trim water supplied through the spray nozzles 150.

The final effluent material from the pug mill 100 has proven to be satisfactory for use in land fill and soil beneficiation. The calcium sulphite is well dispersed within the dry particulate or fly ash material and with a percentage of calcium sulphate less than 50 percent of the total mix, the material has a consistency which is entirely suitable for land fill projects even though it may be wetter than fly ash or dry particulate materials alone.

The method and apparatus of the present invention provides a system wherein exhaust of flue gas discharged to the atmosphere is properly treated to conform to acceptable standards of sulphur dioxide content and particulate matter content. In addition visible moisture in the form of a stack plume is eliminated. The wet sludge material produced in the wet scrubber absorber stage 24 of the process is mixed with the dry particulate material separated from the dry separation stage 22 providing a readily disposable material which is suitable for land fill and soil beneficiation. If trace quantities of minerals etc. or materials other than those separated from the gas stream are needed for soil beneficiation, these materials can be added into the pug mill 200 and then during the mixing stage become distributed uniformly throughout the mixture.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of removing particulates and oxides of sulphur from gas comprising: passing said gas through a dry separation stage for removal of dry particulates; passing a portion of the gas treated in said dry stage through a wet absorber stage for removal of said oxides of sulphur; and reuniting the gas treated only in said dry stage with said gas treated in said wet absorber stage prior to discharge of the reunited mixture to the atmosphere.

2. The method of claim 1 wherein said gas is intermixed in said wet absorber stage with scrubbing liquor including a mixture of limestone and water for precipitating out said oxides of sulphur in the form of calcium sulphate and/or calcium sulphite.

3. The method of claim 2 wherein said gas in said wet absorber stage is washed with water following said intermixing treatment with said scrubbing liquor.

4. The method of claim 2 wherein said scrubbing liquor is intermixed with said gas in a finely divided spray of liquid droplets directed counter-current to the direction of gas flow.

5. The method of claim 4 including the step of collecting said precipitated out materials and removing the same from contact with said gas.

6. The method of claim 1 including the step of cooling said gas treated only in said dry treatment stage before reuniting with said gas treated in said wet absorber stage.

7. The method of claim 1 wherein said dry treatment stage comprises electrostatic precipitation of said particulates out of said gas.

8. A method of removing particulates and oxides of sulphur from gas comprising: passing said gas through a dry treatment stage for separating dry particulates from the gas; passing a portion of said gas treated in said dry treatment stage through a wet absorber stage for separating said oxides of sulphur from the gas; and intermixing said dry particulates separated in said dry treatment stage with wet material separated from said gas in said wet absorber stage for discharge as fill material.

9. The method of claim 8 including the step thickening said wet material separated from said gas in said wet absorber stage prior to intermixing with said dry particulates.

10. The method of claim 9 including the step of adding moisture during the step of intermixing said dry particulates with said material separated from the gas in said wet absorber stage.

11. The method of claim 8 including the step of intermixing the gas treated only in said dry treatment stage with said portion of gas treated in said wet absorber stage before discharge to the atmosphere.

12. The method of claim 8 wherein said gas in said wet absorber stage is intermixed with scrubbing liquor including a mixture of limestone and water for precipitating out said oxides of sulphur in the form of calcium sulphite and/or sulphate.

13. The method of claim 12 wherein said scrubbing liquid is intermixed with said gas in said wet absorber stage is a finely divided spray of liquid droplets directed countercurrent to the gas flow.

14. A method of treating gas containing particulates and oxides of sulphur before discharge to the atmosphere for reducing air pollution comprising the steps of: passing said gas through an electrostatic precipitator stage for removing dry particulates therefrom; passing a portion of said gas treated in said precipitator stage through a wet scrubbing stage for removal of said oxides of sulphur from said gas, said wet scrubbing stage including the steps of intermixing said gas with scrubbing liquor including a slurry of finely divided limestone and water for combining with said oxides of sulphur to form wet precipitates including calcium sulphate and/or sulphite, and remvoing said precipitates from said gas; and intermixing said wet precipitates with said dry particulates removed in said precipitator stage forming semi-dry material for land fill.

15. The method of claim 14 including the steps of thickening said wet precipitates before intermixing with said dry particulates.

16. The method of claim 14 wherein said dry particulates and said wet precipitates are intermixed at a predetermined ratio of produce said semi-dry material with a selected moisture content.

17. The method of claim 16 including the step of adding trim water during intermixing of said dry particulates and wet precipitates.

18. The method of claim 14 including the step of intermixing said gas passed only through said precipitator stage with said portion of said gas passed through said wet scrubbing stage before discharge to the atmosphere.

19. The method of claim 18 including the step of cooling said gas passed only through said precipitator stage before intermixing with said portion of said gas passed through said wet scrubbing stage.

20. A pollution control system for gas containing particulates and oxides of sulphur comprising: dry separator means for removing dry particulates from said gas; wet scrubber means for removing oxides of sulphur in the form of wet precipitates from a part of said gas treated by said dry separator means; and material mixing means for blending said removed wet precipitates forming a semi-dry material.

21. The pollution control system of claim 20 including gas mixing means for intermixing said gas passed only through said dry separator means with said portion of gas passed through said wet scrubber means prior to discharge.

22. The system of claim 20 including means for removing moisture from said wet precipitates prior to entering said material mixer means.

23. The system of claim 20 including means for wetting said dry particulates in said material mixing means.

24. The system of claim 20 wherein said wet scrubber means includes spray means for intermixing finely divided droplets of scrubbing liquor with said gas, said scrubbing liquid including a slurry of water and limestone forming wet precipitates including calcium sulphite and/or sulphate and means for removing said wet precipitates from said gas.

25. The system of claim 24 including spray means for washing said after intermixing with said scrubbing liquor.

* * * * *